United States Patent
Wu

(10) Patent No.: US 10,932,215 B2
(45) Date of Patent: Feb. 23, 2021

(54) DATA TRANSMISSION CONTROL METHOD AND APPARATUS, AND TERMINAL

(71) Applicants: AUTEL HECHUANG SOFTWARE DEVELOPMENT CO. LTD., Guangdong (CN); AUTEL INTELLIGENT TECHNOLOGY CORP., LTD., Guangdong (CN)

(72) Inventor: Yong Wu, Guangdong (CN)

(73) Assignees: AUTEL HECHUANG SOFTWARE DEVELOPMENT CO. LTD., Shenzhen (CN); AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 0 days.

(21) Appl. No.: 16/451,661

(22) Filed: Jun. 25, 2019

(65) Prior Publication Data

US 2019/0349875 A1 Nov. 14, 2019

Related U.S. Application Data

(63) Continuation of application No. PCT/CN2017/109557, filed on Nov. 6, 2017.

(30) Foreign Application Priority Data

Dec. 27, 2016 (CN) .......................... 201611225959.0

(51) Int. Cl.
*H04W 56/00* (2009.01)
*H04W 76/40* (2018.01)
(Continued)

(52) U.S. Cl.
CPC ....... *H04W 56/005* (2013.01); *B60C 23/0455* (2013.01); *H04W 56/003* (2013.01); *H04W 76/40* (2018.02); *H04W 84/20* (2013.01)

(58) Field of Classification Search
CPC . H04W 56/005; H04W 76/40; H04W 56/003; H04W 84/20; B60C 23/0455;
(Continued)

(56) References Cited

U.S. PATENT DOCUMENTS

2007/0052519 A1 3/2007 Talty et al.
2007/0052520 A1 3/2007 Talty et al.
(Continued)

FOREIGN PATENT DOCUMENTS

| CN | 1607753 A | 4/2005 |
|---|---|---|
| CN | 103826252 A | 5/2014 |

(Continued)

*Primary Examiner* — Thai Nguyen

(57) ABSTRACT

A data transmission control method and apparatus, and a terminal are disclosed. The method includes: performing, by a master terminal, a timing negotiation with respective slave terminals to obtain timings allocated to the respective slave terminals; sending, upon completion of timing allocation, interactive data by means of broadcasting, the interactive data being sent to the slave terminals; receiving responses of the respective slave terminals to the received interactive data according to the allocated corresponding timings; and acknowledging, using the received responses, completion of transmission of the interactive data to the slave terminals. The data transmission control method and apparatus and the terminal can be used to improve data transmission efficiency and channel utilization.

15 Claims, 10 Drawing Sheets

(51) Int. Cl.
*B60C 23/04* (2006.01)
*H04W 84/20* (2009.01)

(58) Field of Classification Search
CPC .... B60C 23/0471; B60C 23/0479; H04J 3/16;
H04L 1/0006
See application file for complete search history.

(56) References Cited

U.S. PATENT DOCUMENTS

| | | |
|---|---|---|
| 2007/0096889 A1 | 5/2007 | Alrabady et al. |
| 2007/0096890 A1 | 5/2007 | Talty et al. |
| 2014/0165026 A1 | 6/2014 | McIntyre et al. |
| 2015/0239308 A1 | 8/2015 | Yu et al. |
| 2016/0303926 A1 | 10/2016 | Hongjing et al. |
| 2018/0014352 A1* | 1/2018 | Yanagi .................. H04L 1/1678 |

FOREIGN PATENT DOCUMENTS

| | | |
|---|---|---|
| CN | 105813026 A | 7/2016 |
| CN | 106712904 A | 5/2017 |

* cited by examiner

DATA TRANSMISSION CONTROL METHOD
AND APPARATUS, AND TERMINAL

This application claims priority to and benefits of Chinese Patent Application No. 201611225959.0, filed with the State Intellectual Property Office of P. R. China on Dec. 27, 2016. The entire content of the above-referenced application is incorporated herein by reference.

BACKGROUND

Technical Field

This application relates to the technical field of wireless communications, and in particular, to a data transmission control method and apparatus, and a terminal.

Related Art

With the development of radio, wireless data transmission is very widely applied. At present, one-to-one transmission is usually used, that is, data is transmitted to another terminal by the same frequency and in the same channel.

When data needs to be wirelessly transmitted to a plurality of terminals, one-to-multiple transmission by the same frequency and in the same channel may likely cause interference, resulting in poor stability. At present, in the case of one-to-multiple data transmission, a master terminal interacts with a plurality of slave terminals in a polling manner in different periods of time, so that the same data is transmitted to different slave terminals through multiple transmissions during different periods of time. Data transmission is completed by multiple transmissions. However, the entire data transmission process is inefficient, and the channel utilization is low, especially for the one-to-multiple data transmission process used in the technical area of tire pressure sensor. Specifically, when a special services tool as a master terminal needs to transmit data to multiple tire pressure sensors (as slave terminals) in the car, it is inefficient to transmit data by the method of the art.

SUMMARY

In order to solve the technical problems in the related art of inefficient data transmission process and low channel utilization during data transmission, this application provides a data transmission control method and apparatus, and a terminal.

In a first aspect, an embodiment of this application provides a data transmission control method. The method is applied to a master terminal allowed for data transmission with at least two slave terminals. The method includes:

performing a timing negotiation with the respective slave terminals to obtain timings allocated for the respective slave terminals;

sending, upon completion of timing allocation, interactive data by means of broadcasting, the interactive data being sent to the slave terminals;

receiving responses of the respective slave terminals to the received interactive data according to the allocated corresponding timings; and acknowledging, using the received responses, completion of transmission of the interactive data to the slave terminals.

In a second aspect, an embodiment of this application provides a data transmission control method. The method is applied to slave terminals for data transmission with a master terminal. The master terminal is allowed for data transmission with at least two of the slave terminals. The method includes:

acquiring timings obtained by performing a timing negotiation with the master terminal and allocated for the slave terminals;

receiving, upon obtaining of the timings, interactive data sent by the master terminal by means of broadcasting; and responding to the interactive data according to the allocated timings.

In a third aspect, an embodiment of this application provides a data transmission control apparatus. The apparatus is applied to a master terminal allowed for data transmission with at least two slave terminals. The apparatus includes:

a first timing negotiation module, configured to perform a timing negotiation with the respective slave terminals to obtain timings allocated for the respective slave terminals;

a data sending module, configured to send, upon completion of timing allocation, interactive data by means of broadcasting, the interactive data being sent to the slave terminals;

a response receiving module, configured to receive responses of the respective slave terminals to the received interactive data according to the allocated corresponding timings; and a transmission determination module, configured to acknowledge, using the received responses, completion of transmission of the interactive data to the slave terminals.

In a fourth aspect, an embodiment of this application provides a data transmission control apparatus. The apparatus is applied to slave terminals for data transmission with a master terminal. The master terminal is allowed for data transmission with at least two of the slave terminals. The apparatus includes:

a second timing negotiation module, configured to acquire timings obtained by a timing negotiation with the master terminal and allocated for the slave terminals;

a data receiving module, configured to receive, upon obtaining of the timings, interactive data sent by the master terminal by means of broadcasting; and a response module, configured to respond to the interactive data according to the allocated timings.

In a fifth aspect, an embodiment of this application provides a master terminal. The master terminal is allowed for data transmission with at least two slave terminals. The master terminal includes:

at least one processor; and a memory communicatively connected to the at least one processor, wherein the memory stores an instruction executable by the at least one processor, the instruction being executed by the at least one processor to enable the at least one processor to perform the method provided in the first aspect.

In a sixth aspect, an embodiment of this application provides a slave terminal. The slave terminal is used for data transmission with a master terminal. The master terminal is allowed for data transmission with at least two slave terminals. The slave terminal includes:

at least one processor; and a memory communicatively connected to the at least one processor, wherein the memory stores an instruction executable by the at least one processor, the instructions being executed by the at least one processor to enable the at least one processor to perform the method provided in the second aspect.

The technical solutions provided by the embodiments of this application may include the following beneficial effects:

During data transmission between a master terminal and a plurality of slave terminals, the master terminal performs a timing negotiation with the slave terminals to obtain timings allocated for the slave terminals. Upon completion of timing allocation, the master terminal sends interactive data by means of broadcasting. When responses of the respective slave terminals to the received interactive data according to the allocated corresponding timings are received, completion of transmission of the interactive data to the slave terminals is acknowledged using the received responses. During the data transmission, the master terminal only needs to send interactive data once, and upon receiving of the interactive data, the respective slave terminals make responses in a polling manner according to the allocated timings, thereby improving the data transmission efficiency and the channel utilization.

It will be appreciated that the above general description and the following detailed description are merely exemplary and are not intended to limit this application.

BRIEF DESCRIPTION OF THE DRAWINGS

The drawings herein are incorporated in the specification and constitute a part of the specification. Embodiments consistent with this application are shown and used in conjunction with the specification to explain the principles of this application.

DETAILED DESCRIPTION

The description will be made in detail herein with respect to exemplary embodiments, examples of which are illustrated in the accompanying drawings. Implementation manners described in the following exemplary embodiments do not represent all implementation manners consistent with this application. Instead, they are merely examples of apparatuses and methods consistent with aspects of this application as detailed in the appended claims.

Figure 1:
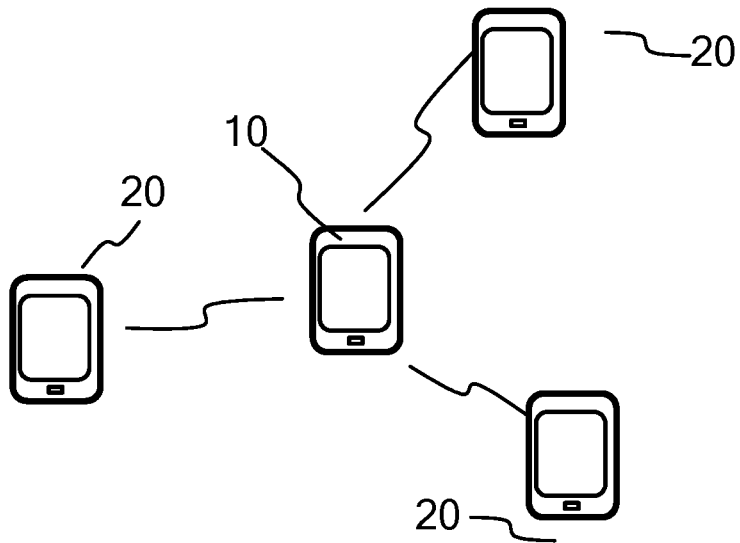
FIG. 1 is a schematic diagram of an implementation environment according to an embodiment of this application.

FIG. 1 is a schematic diagram of an implementation environment according to this application. As shown in FIG. 1, the implementation environment includes a master terminal 10 and a plurality of slave terminals 20 that perform mutual data transmission with the master terminal 10. The master terminal 10 and the plurality of slave terminals 20 perform a timing negotiation respectively, thereby performing data transmission. The master terminal 10 and the plurality of slave terminals 20 are communicatively connected in a wireless manner, such as wireless fidelity (WiFi), Bluetooth, and Zigbee (IEEE 802.15.4 standard), which will not be limited in the present embodiment. The master terminal 10 and the slave terminals 20 may be wireless communication devices, such as an unmanned aerial vehicle, a mobile phone, a computer, a tire pressure sensor or a programming tool in a tire pressure monitor system (TPMS), or an automobile diagnosis instrument. A specific implementation manner is not limited by the present embodiment.

It will be appreciated that the master terminal 10 may also serve as a slave terminal under other master terminals in some embodiments, and the slave terminal 20 may also serve as a master terminal in some embodiments. A specific implementation manner is not limited by the present embodiment.

Figure 2:
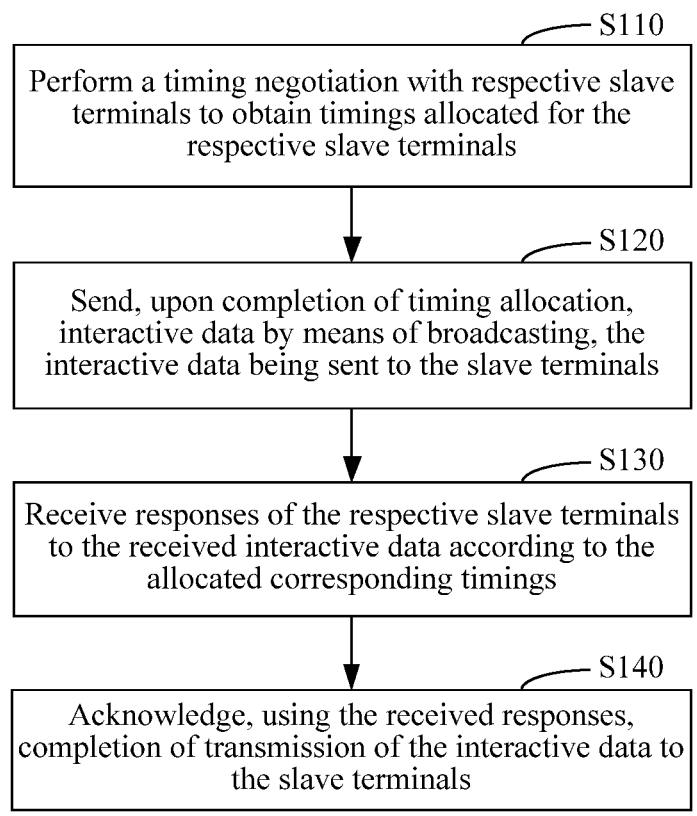
FIG. 2 is a flowchart of a data transmission control method according to an exemplary embodiment.

FIG. 2 is a flowchart of a data transmission control method according to an exemplary embodiment. As shown in FIG. 2, the data transmission control method is applied to a master terminal allowed for data transmission with at least two slave terminals. The data transmission control method may include the following steps.

In step S110, The master terminal performs a timing negotiation with respective slave terminals to obtain timings allocated to the respective slave terminals.

The slave terminals are objects that establish a communication connection with the master terminal. For examples, the slave terminals are tire pressure sensors, and the master terminal is a programming tool (i.e., a special serves tool). The timing is a responding time sequence of the slave terminals to the master terminal upon after the slave terminals receives of data transmitted by the master terminal. In one embodiment, a specific process of performing a timing negotiation between a master terminal and a plurality of slave terminals is as follows:

S1101: The master terminal sends connection request instructions to the plurality of slave terminals in a manner of sending a broadcast frame. The connection request instruction includes a data frame. The data frame may contain a special slave identification code, which is different from the own identification codes of all slave terminals to be connected. Preferably, it is a binary number all-1 or all-0. The data frame carrying the special slave identification code is called a broadcast frame.

S1102: After receiving of the connection request instruction, a slave terminal firstly determines whether the identification code in the broadcast frame is the same as its own identification code; if yes, the slave terminal responds directly to the master terminal; otherwise, the slave terminal further determines whether the identification code is the special slave identification code, if yes, the slave terminal makes a response by random delaying for a period of time, the response data carries its own unique identification code.

S1103: The master terminal receives response instructions from the respective slave terminals, sends timing allocation instructions to the respective slave terminals according to the number i of the allocated timing, and waits for acknowledgment from the respective slave terminals. The timing allocation instruction contains the unique identification code of each slave terminal from which the mater terminal just received.

S1104: After receiving of the timing allocation instruction, the slave terminal sets a current response delay timing according to the timing allocation instruction, sends an acknowledgment response aiming to the timing allocation instruction, closes a request response, and then starts a timeout mechanism (having not received any instruction from the master terminal within a period of time). That is, the slave terminal makes no response to any request instruction of the master terminal until the time is out or a disconnection instruction is received. The slave terminal will delay a response to the broadcast frame by the allocated timing before it receives a new timing allocation instruction.

S1105: After receiving acknowledgment instructions from the respective slave terminals, the master terminal records the allocated timings to the respective slave terminals in an internal timing list of the master terminal, which is used for subsequent communication check and verification. At the same time, the operation of step S1101 is repeated until there is no response of any slave terminal within a certain number of times n, and then all timing allocations are completed.

The data transmission between the master terminal and the slave terminal is implemented according to the timing allocated by the master terminal to the slave terminal.

The data packets overlapping may occur due to simultaneous response of a plurality of slave terminals, so that interference with the data transmission from the master terminal to the respective slave terminals may occur and may further cause transmission instability. Therefore, in the present embodiments, the timings are allocated to the respective slave terminals in advance, the respective slave terminals respond according to the respective allocated timings, and the timings allocated to different slave terminals are different, so that the response time of the respective slave terminals is staggered to avoid the data packages overlapping during the responses, and the stability of data transmission is improved.

When the master terminal allocates a timing to a slave terminal, the master terminal and the slave terminal may negotiate a timing at which both of them are in an idle state, thereby avoiding from overlapping with time for data transmission between the slave terminal and other slave terminals.

In step S120, after completion of timing allocation, the master terminal sends interactive data to the slave terminals by means of broadcasting.

It should be noted that each terminal has its own terminal identifier, terminal identifiers of different terminals being different from each other.

The slave terminal stores a terminal identifier of the master terminal which is communicatively connected to, and the master terminal also stores a terminal identifier of the slave terminal which is communicatively connected to. When the master terminal sends interactive data in the form of broadcasting, the slave terminal storing the terminal identifier of the master terminal may receive the interactive data sent by the master terminal.

In an exemplary embodiment, the interactive data is a data frame, and the interactive data is transmitted frame by frame through a communication connection.

In step S130, the master terminal receives responses to the interactive data respectively from each of the slave terminals according to the allocated corresponding timings.

After receiving of the interactive data, the slave terminal responds to the interactive data according to the allocated timing instead of responding immediately. Therefore, the master terminal can only receive a response from one slave terminal at a time, so that the data packages overlapping may be avoided.

For example, a terminal A (master terminal) establishes a communication connection with terminals B1, B2 and B3 (three slave terminals) respectively, and timings allocated to the terminals B1, B2 and B3 are timing 1, timing 2 and timing 3, respectively. Each period of data transmission between the terminal A and the terminals B1, B2 and B3 includes the timings 1, 2 and 3. I.e., in each period of terminal A respectively receiving from terminal B1, terminal B2 and terminal B3, the receiving sequence will be timing 1, timing 2 and timing 3, that is, the terminal B1 sends response at timing 1, terminal B2 sends response at timing 2, and terminal B3 sends response at timing 3. After the terminal A sends interactive data, it may respectively receive responses from the terminals B1, B2 and B3 according to the timings 1, 2 and 3 in the data transmission period.

In step S140, the master terminal determines the completion of interactive data transmission by receiving the responses.

By means of the above-described method, a master terminal performs a timing negotiation with slave terminals to obtain timings allocated to the slave terminals, and after broadcasting interactive data to the slave terminals, the master terminal may respectively receive responses from the slave terminals aiming to the received interactive data according to the allocated timings. Since the timings allocated to different slave terminals are different from each other, it is only necessary to send the interactive data once, and the respective slave terminals respond in a polling manner according to the allocated timings, so that data packages overlapping is avoided, and data in a channel is protected from interference, thereby improving data transmission efficiency, stability and channel utilization.

Alternatively, according to the description of the details of step S110 shown according to an exemplary embodiment, step S110 may include the following steps.

A predetermined number of communication connection broadcasts are initiated, for each communication connection broadcast, a timing negotiation is performed with a slave terminal responding to the communication connection broadcast, and the negotiated timing is allocated to the corresponding slave terminal.

The communication connection broadcast is used to request a communication connection with other terminals. The communication connection broadcast does not specify a specific terminal identifier, and other terminals respond according to their own operating states after receiving of the communication connection broadcast.

It should be noted that after the master terminal initiates the communication connection broadcast, since there is not enough time for the slave terminal to respond due to a short time or a plurality of slave terminals respond at the same time, the master terminal cannot perform a timing negotiation with these slave terminals. Therefore, by initiating multiple communication connection broadcasts, the situation that a timing negotiation cannot be performed with the slave terminal may be avoided.

The number of times for initiating the communication connection broadcast is predetermined. After initiation of a first communication connection broadcast, regardless of whether or not a response of the slave terminal is received, the next communication connection broadcast is initiated according to a predetermined time until the number of times for initiating the communication connection broadcast reaches a predetermined number of times.

When the master terminal initiates the communication connection broadcast, the slave terminals respond after a random delay, so as to try to make time of receiving the responses of the respective slave terminals staggered.

Since the respective slave terminals respond to the communication connection broadcast after a random delay, it is possible that the random delays of responses of two or more slaves terminal are the same, so that the master terminal receives the responses of two or more slave terminals at the same time, a data packages overlapping occurs, and thus the master terminal cannot recognize the slave terminals which acknowledges the timings.

In order to avoid the phenomenon that responses of a plurality of slave terminals which are received at the same time cannot be recognized, a certain number of communication connection broadcasts are predetermined, so that other slave terminals continue to respond after a random delay. As a predetermined number of times is larger, the number of times for acknowledging timings is larger, and the probability of overlapping responses of slave terminals after a random delay is lower.

After responding to a certain communication connection broadcast of the master terminal and in an idle timing, the slave terminal will remain a state of silence and will not respond to the next same communication connection broadcast of the master terminal.

With the number of times for initiating the communication connection broadcast increasing, the number of the slave terminals which responds to the master terminal increases, and thus the probability of responses of the slave terminals is improved, and the phenomenon is avoided which data transmission cannot be realized since some slave terminals cannot perform a timing negotiation with the master terminal due to mis-responding.

If responses from some slave terminals to a predetermined number of communication connection broadcasts are not received, it may be determined that timing negotiation and data transmission are not performed with these slave terminals, thereby avoiding the phenomenon that the master terminal goes into an infinite waiting state since some slave terminals do not make timing responses.

By using the above-described method, a predetermined number of communication connection broadcasts are initiated, it is maximally ensured that the slave terminals respond to the communication connection broadcasts, thus improving the accuracy of data transmission.

Figure 3:
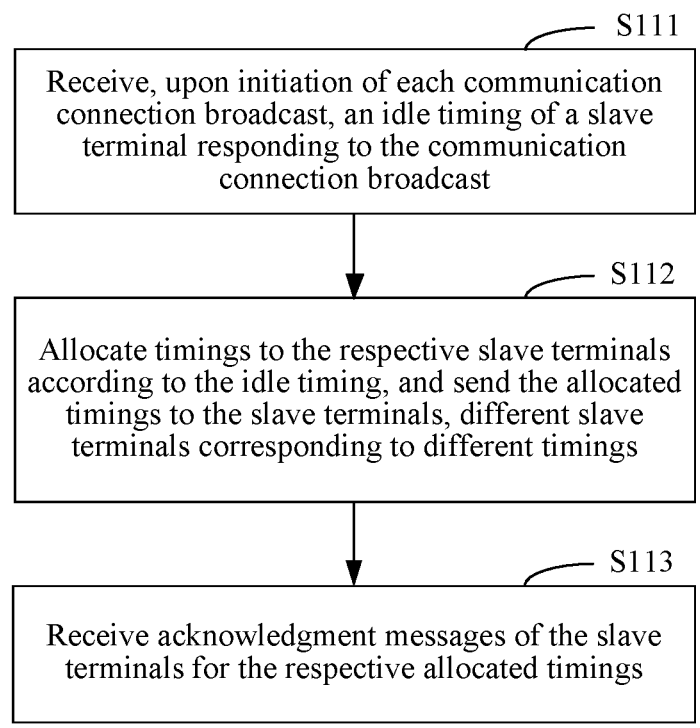
FIG. 3 is a specific implementation flowchart of performing step S110 in the data transmission control method shown by the corresponding embodiment of FIG. 2 once.

FIG. 3 is a further description of details of step S110 according to an exemplary embodiment. Step S110 may include the following steps.

In step S111, upon initiation of each communication connection broadcast, an idle timing of the slave terminal responding to the communication connection broadcast is received.

It should be noted that one terminal receives data transmitted from a certain terminal in one communication connection, may also receive data transmitted from another terminal in other communication connections, and may also transmit data to other terminals in other communication connections.

For example, a terminal B1 is communicatively connected to a terminal A1, and receives data transmitted by the terminal A1. The terminal B1 is communicably connected to a terminal C1, and transmits data to the terminal C1.

Each communication connection occupies the timing of a terminal. To avoid the instability of data transmission caused by overlapping of a plurality of timings, after a terminal initiates a communication connection broadcast, other terminals need to return an idle timing to the terminal according to their own timing conditions.

For example, a communication connection period includes five timings, namely, timings 1, 2, 3, 4, and 5, and a communication connection between the terminal B1 and other terminals occupies the timings 1 and 3. Therefore, the timings 2, 4 and 5 are idle timings of the terminal B1. After the terminal B1 receives the communication connection broadcast sent by the terminal A, the terminal A will receive the timings 2, 4 and 5 of responding of the terminal B1.

In step S112, timings are allocated to the slave terminals according to the idle timing, and the allocated timings are sent to the slave terminals, different slave terminals corresponding to different timings.

In order to ensure different timings allocated to different terminals, timing allocation is performed according to the idle timing of responding of each terminal. The timing allocated to each terminal is one of its idle timings, and it is ensured that the timing satisfies the communication connection of the terminals. Specifically, the master terminal allocates timings to the respective slave terminals according to the received idle timings fed back by the respective slave terminals and the number of the connected slave terminals.

For example, a communication connection period includes five timings, namely, timings 1, 2, 3, 4, and 5. A terminal A receives idle timings 2 and 5 of responding of a terminal B1, receives idle timings 2 and 3 of responding of a terminal B2, and receives an idle timing 3 of responding of a terminal B3. The timings allocated to the terminals B1, B2 and B3 by the terminal A are the timings 5, 2 and 3 respectively according to the idle timings of responding of the terminals B1, B2 and B3.

In step S113, the master terminal receives acknowledgment messages of the slave terminals for the respective allocated timings.

After receiving a timing allocated by the master terminal, a slave terminal may re-acknowledge the allocated timing to acknowledge whether the allocated timing meets a current data transmission condition of the slave terminal. If yes, an acknowledgment message is returned to the master terminal, the slave terminal remains silent and does not respond to any request within a period of time. Otherwise, the slave terminal does not return an acknowledgment message, and continues to wait for the next communication connection broadcast of the master terminal. The data transmission condition may include whether the slave terminal has data communication with other terminals at the allocated timing currently, if yes, the timing allocated by the master terminal does not meet the data transmission condition, and if no, the data transmission condition is met. The data transmission condition may further include whether the operating efficiency of the slave terminal meets the requirement of the allocated timing currently. If yes, the data transmission condition is met. If no, the data transmission condition is not met.

By means of the above-described method, a master terminal receives, through communication connection broadcasts, idle timing of responding of slave terminals, and allocates timings to the respective slave terminals according to the idle timings to ensure that the allocated timings satisfy own states of the respective slave terminals. The timing allocation is completed after the master terminal receives a timing acknowledgment of the slave terminals for the allocated timings. Thus, the respective slave terminals make data responses in a polling manner according to the allocated timings, so that a stacking phenomenon is avoided, and data in a channel is protected from interference, thereby improving data transmission efficiency, stability and channel utilization.

Figure 4:
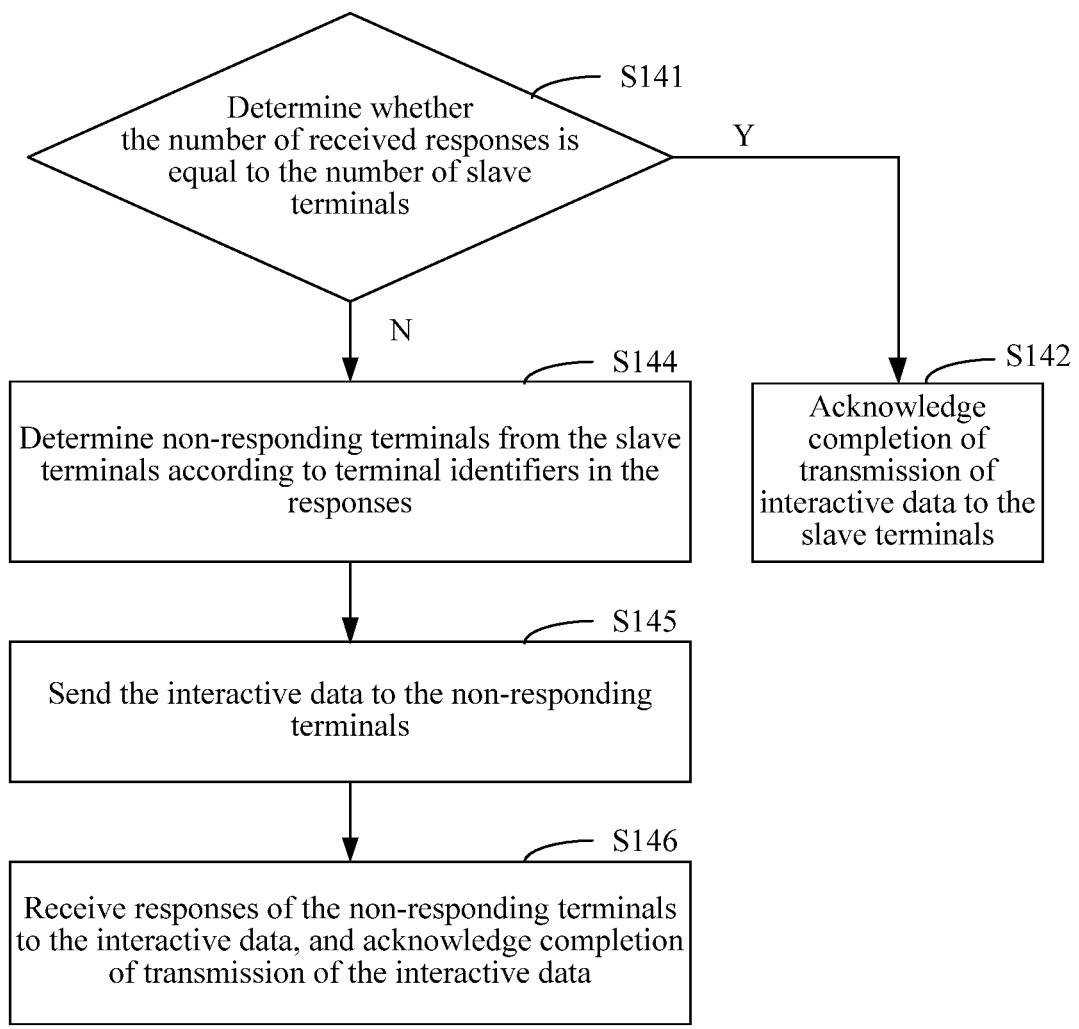
FIG. 4 is a specific implementation flowchart of step S140 in the data transmission control method shown by the corresponding embodiment of FIG. 2.

FIG. 4 is a description of details of step S140 according to an exemplary embodiment. Step S140 may include the following steps.

In step S141, it is determined whether the number of the received responses is equal to the number of the slave terminals. If yes (Y), step S142 is performed, and if no (N), step S144 is performed.

It should be noted that each transmitted interactive data has its specific data sequence number.

For the interactive data corresponding to each data sequence number, the master terminal can only receive one response from each slave terminal.

When the number of the received responses is equal to the number of the slave terminals, it is indicated that all the slave terminals have received the interactive data and responded, transmission of the interactive data having this data sequence number to the slave terminals is acknowledged.

When the number of the received responses is not equal to the number of the slave terminals, it is indicated that some slave terminals do not respond to the transmission of the interactive data having this data sequence number since the slave terminals may not receive the interactive data having this data sequence number or the slave terminals may not respond after receiving of the interactive data. Therefore, it is necessary to find a slave terminal that has not responded for acknowledging data transmission.

In step S142, the master terminal determines completion of transmission of the interactive data to the slave terminals.

In step S144, non-responding terminals are determined from the slave terminals according to terminal identifiers in the responses.

According to the terminal identifiers in the received responses, non-responding terminals that have not responded are searched through the terminal identifiers of all the slave terminals.

In step S145, the interactive data is sent to the non-responding terminals.

In an exemplary embodiment, for interactive data corresponding to a certain data sequence number, after a non-responding terminal is found, the interactive data having this data sequence number is separately sent to the non-responding terminal.

In another exemplary embodiment, for interactive data corresponding to a certain data sequence number, when a plurality of non-responding terminals are found, the interactive data having this data sequence number is resent by broadcasting, and the slave terminals which responded to the interactive data having this data sequence number will no longer respond.

In step S146, when the master terminal receives responses of the non-responding terminals to the interactive data, it determines completion of transmission of the interactive data.

It will be appreciated that, in some embodiments, the master terminal may also perform data transmission only with one slave terminal through all or part of the steps in the above-mentioned data transmission control method. Since one slave terminal may perform data communication with a plurality of other terminals within the same time period, the master terminal also needs to consider the timing requirements of the slave terminal when communicating only with the slave terminal.

By means of the above-described method, the number of received responses and the number of slave terminals is compared, and when some of the slave terminals do not respond, interactive data is separately sent, thereby avoiding the phenomenon that some slave terminals do not receive the interactive data, and improving the stability of data transmission.

Figure 5:
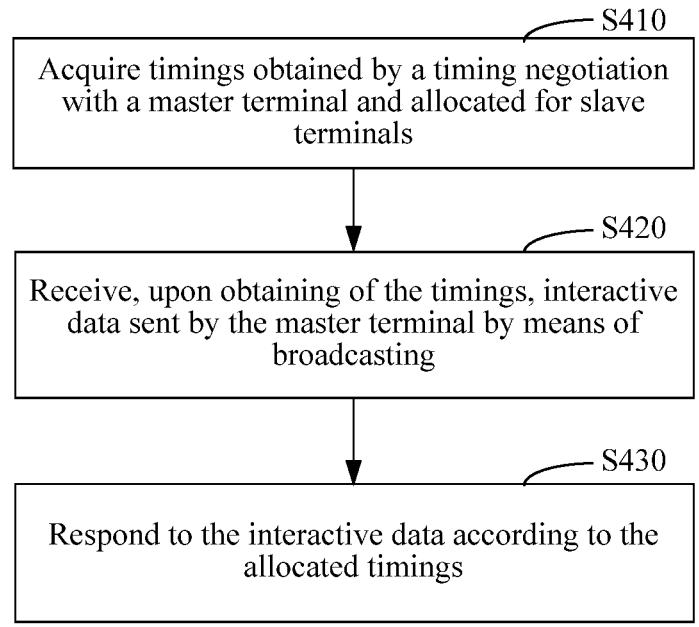
FIG. 5 is a flowchart of a data transmission control method according to an exemplary embodiment.

FIG. 5 is a flowchart of a data transmission control method according to an exemplary embodiment. The data transmission control method is applied to a slave terminal for data transmission with a master terminal. The master terminal is allowed for data transmission with at least two slave terminals. As shown in FIG. 5, the data transmission control method may include the following steps.

In step S410, A slave terminal obtains timings allocated by a timing negotiation with the master terminal.

By performing a timing negotiation with the master terminal, the slave terminals perform data transmission with the master terminal according to the allocated timings.

The timing is a time sequence in which a terminal responds upon receiving of transmitted data. The timings allocated to the slave terminals are sent to the slave terminals by the master terminal.

A data packages overlapping may occur due to simultaneous response of a plurality of slave terminals, resulting in interference with data transmission to cause instability. Therefore, the master terminal allocates timings to the slave terminals in advance, and the slave terminals respond according to the allocated timings, and the timings allocated to different slave terminals are different, so that the time of responses of the respective slave terminals is staggered to avoid the stacking phenomenon during the responses, and the stability of data transmission is improved.

In step S420, after obtaining of the timings, the slave terminal receives interactive data sent by the master terminal by means of broadcasting is received.

It should be noted that each terminal has its own terminal identifier, terminal identifiers of different terminals being different from each other.

The slave terminal stores a terminal identifier of the master terminal allocating a timing thereto upon completion of timing allocation, and the master terminal also stores a terminal identifier of the slave terminal communicatively connected thereto. The slave terminal only receives the interactive data sent by the terminal corresponding to the stored terminal identifier by means of broadcasting.

In step S430, the slave terminal makes a response to the interactive data according to the allocated timings.

Upon receiving of the interactive data, the slave terminal responds according to the allocated timing instead of responding immediately. The stacking phenomenon caused by simultaneous response of other slave terminals connected to the master terminal is avoided.

By means of the above-described method, a slave terminal performs a timing negotiation with a master terminal to obtain a timing allocated to the slave terminal, and responds according to the allocated timing upon receiving of interactive data. A stacking phenomenon caused by simultaneous response of other slave terminals connected to the master terminal is avoided. The stability of data transmission is improved.

Figure 6:
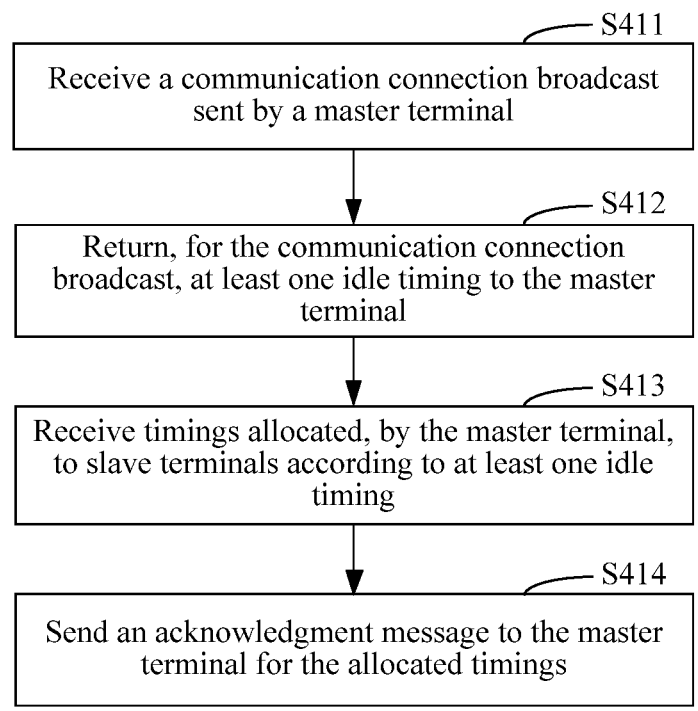
FIG. 6 is a specific implementation flowchart of step S410 in the data transmission control method shown by the corresponding embodiment of FIG. 5.

FIG. 6 is a description of details of step S410 according to an exemplary embodiment. Step S410 may include the following steps.

In step S411, a slave terminal receives a communication connection broadcast sent by a master terminal.

In step S412, for the communication connection broadcast, the slave terminal returns at least one idle timing to the master terminal.

It should be noted that one terminal receives data transmitted from a certain terminal in one communication connection, may also receive data transmitted from another terminal in other communication connections, and may also transmit data to other terminals in other communication connections.

A slave terminal determines an idle timing of responding according to its own communication connection state upon receiving of the communication connection broadcast.

For example, a communication connection period includes five timings, namely, timings 1, 2, 3, 4, and 5, a communication connection between a terminal B1 (slave terminal) and other terminals occupies the timings 1 and 3, and idle timings of the terminal B1 is the timings 2, 4 and 5. Therefore, after the terminal B1 receives a communication connection broadcast sent by a terminal A (master terminal), the terminal B1 returns the timings 2, 4 and 5 to the terminal A.

In step S413, the slave terminal receives timing allocated by the master terminal according to at least one idle timing.

In order to ensure different timings allocated to different slave terminals, the master terminal will comprehensively analyze the idle timings returned by the slave terminals and other terminals, and will allocate the timings to the slave terminals. The allocated timing received by the slave terminal is one of its idle timings, so it is ensured that the timing satisfies the communication connection requirements of the slave terminal.

For example, a communication connection period includes five timings, namely, timings 1, 2, 3, 4, and 5. The idle timings returned for the terminal A by the terminal B1 are 2 and 5. The terminal B1 will receive a timing allocated by the terminal A, that is, the timing 2 or 5, upon timing allocation of the terminal A.

In step S414, an acknowledgment message is sent to the master terminal for the allocated timings.

In an implementation manner, a specific implementation manner of step S414 of sending an acknowledgment message to the master terminal for the allocated timings may include the following steps.

It is determined whether the allocated timing meets a current data transmission condition of the slave terminal. If yes, an acknowledgment message is sent to the master terminal.

The data transmission condition may include whether the slave tell final has data communication with other terminals at the allocated timing currently, if yes, it is indicated that the timing allocated by the master terminal does not meet the data transmission condition, and if no, the allocated timing meets the data transmission condition. The data transmission condition may further include whether the operating efficiency of the slave terminal meets the requirement of the allocated timing currently. If yes, the data transmission condition is met. If no, the data transmission condition is not met. When sending the acknowledgment message to the master terminal, the slave terminal will remain silent and will not respond to any request within a period of time. When the allocated timing does not meet the data transmission condition of the slave terminal, the slave terminal will not return the acknowledgment message to the master terminal, and continues to wait for the next communication connection broadcast of the master terminal.

By means of the above-described method, after receiving a communication connection broadcast sent by a master terminal, a slave terminal returns an idle timing according to its own connection state, and acknowledges an allocated timing to make the timing of responding not overlap with timings of responding of other terminals. A stacking phenomenon is avoided. The stability of data transmission is improved.

The following describes the above data transmission control method in conjunction with a specific application scenario. The data transmission control method operates in a terminal.

In a specific application scenario, a tire pressure monitor system (TPMS) is provided with four tire pressure sensors to monitor a tire pressure in real time during vehicle driving, and to give an alarm about flat tires and low pressure, thereby ensuring driving safety. A universal TPMS sensor is generally used. Since an internal program is blank during the delivery of the universal TPMS sensor, when repairing or replacing, a tool A should be used to program four universal TPMS sensors B1, B2, B3 and B4 to match a model. In the present embodiment, interactive data is programming data.

Figure 7:
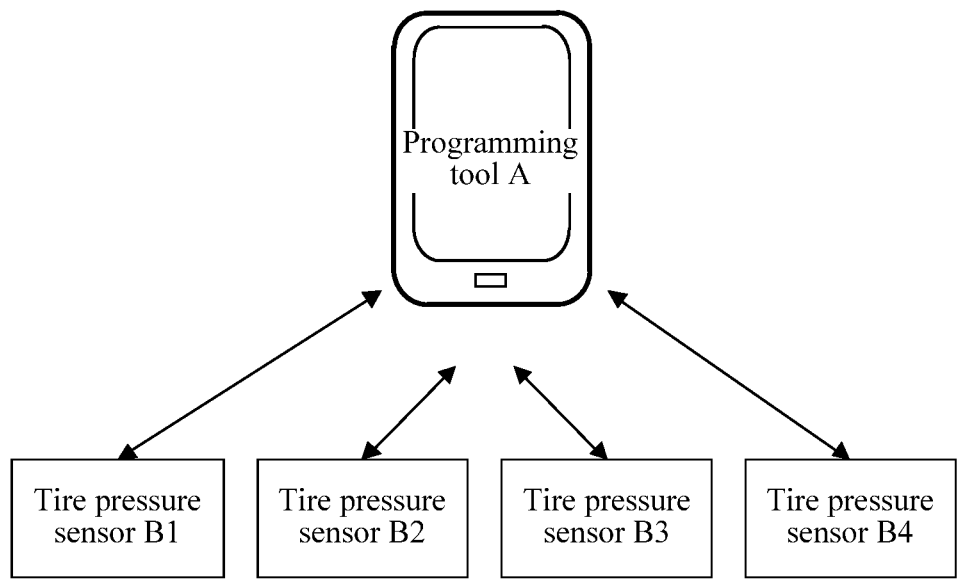
FIG. 7 is a schematic diagram of a scenario where four sensors are programmed and configured by a tool in a TPMS.

FIG. 7 is a schematic diagram of a scenario where four tire pressure sensors are programmed by a programming tool in a TPMS. As shown in FIG. 7, a programming tool A performs a timing negotiation with tire pressure sensors B1, B2, B3 and B4 respectively to obtain timings allocated to the tire pressure sensors B1, B2, B3 and B4 respectively. The programming tool A initiates a predetermined number of communication connection broadcasts, performs, for each communication connection broadcast, a timing negotiation with the tire pressure sensor responding to the communication connection broadcast, and allocates the negotiated timing to the corresponding tire pressure sensor. The programming tool A receives, after initiation of each communication connection broadcast, an idle timing of the tire pressure sensor responding to the communication connection broadcast, allocates timings to the tire pressure sensors according to the idle timing, and sends the allocated timings to the tire pressure sensors, different tire pressure sensors corresponding to different timings. The programming tool A receives acknowledgment messages of the tire pressure sensors for the respective allocated timings.

In the present embodiment, the specific process of performing a timing negotiation between the programming tool A and four tire pressure sensors B1, B2, B3 and B4 is as follows:

S2101: The programming tool A sends connection request instructions to the four tire pressure sensors B1, B2, B3 and B4 in a manner of sending a broadcast frame. The connection request instruction includes a data frame. The data frame includes a special slave identification code, which is different from the own identification codes of all tire pressure sensors to be connected. Preferably, it is a binary number all-1 or all-0. The data frame carrying the special slave identification code is called a broadcast frame.

S2102: Upon receiving of the connection request instruction, each tire pressure sensor determines whether an identification code is the same as the own identification code, and makes a response directly if yes. Otherwise, it is determined whether the identification code is the special slave identification code, and if yes, a response is made upon random delaying for a period of time. Response data will carry its own unique identification code.

S2103: The programming tool A receives response instructions of the respective tire pressure sensors, sends timing allocation instructions to the respective tire pressure sensors according to the number i of the allocated timing, and waits for acknowledgment from the respective tire pressure sensors. The timing allocation instruction includes the unique identification code of each tire pressure sensor just received.

S2104: Upon receiving of the timing allocation instruction, each tire pressure sensor sets a current response timing, makes an acknowledgment response to the timing, closes a request response, and then starts a timeout mechanism (having not received any instruction from the programming tool A within a period of time). There is no response to any request instruction of the master terminal until it has timed out or has not received a disconnection instruction. The broadcast frame received by each tire pressure sensor will delay a response at this timing before the timing allocation instruction is received again.

S2105: Upon receiving of acknowledgment instructions of the respective tire pressure sensors, the programming tool A records the timing of the respective tire pressure sensors in an internal timing list of the programming tool A for subsequent communication check and verification. At the same time, the operation of step S2101 is repeated until there is no response of any tire pressure sensor within a certain number of times n, and then all timing allocations are completed.

Upon completion of timing allocation, the programming tool A sends programming data to the tire pressure sensors B1, B2, B3 and B4 by broadcasting, respectively receives, according to timings allocated to the tire pressure sensors B1, B2, B3 and B4, responses of the corresponding tire pressure sensors B1, B2, B3 and B4 upon receiving of the programming data, and acknowledges completion of transmission of the programming data upon the responses of the tire pressure sensors B1, B2, B3 and B4. Specifically, the programming tool A determines whether the number of the received responses is equal to the number 4 of the tire pressure sensors. If the number is 4, completion of programming of all the tire pressure sensors is acknowledged. If the number of the received responses is not equal to 4, the tire pressure sensor that has not responded is determined according to a tire pressure sensor identifier in the responses, and the programming data is sent thereto again. If the response sent for the programming data by the tire pressure sensor that has not responded is received, completion of transmission of the programming data is acknowledged. If the response has not been received, sending of the programming data is terminated after N attempts, where N is a predetermined integer.

Since the programming data of the four tire pressure sensors B1, B2, B3 and B4 is identical, the programming data is sent once by the programming tool A, and the four tire pressure sensors B1, B2, B3 and B4 sequentially respond to data receiving according to the allocated timings, thereby greatly improving channel utilization, improving the efficiency of programming configuration, and saving programming time. In the above embodiment, the programming tool may also display the results of simultaneously programming the tire pressure sensors B1, B2, B3 and B4 through a screen. In some other embodiments, the quantities of tire pressure sensors may be 2, 3, 5, 6 or a larger number. Since the programming data of a plurality of tire pressure sensors is identical, the programming data is sent once by a programming tool, and the plurality of tire pressure sensors sequentially respond to data receiving according to the allocated timings, thereby greatly improving the efficiency of programming configuration, and saving programming time.

In a specific application scenario, data transmitted by a tire pressure sensor in each tire is received by a receiver in a TPMS. By setting a low frequency (LF) hardware module in a receiver A, the receiver A establishes a communication connection with each tire pressure sensor, and each tire pressure sensor determines its own response timing according to its own position in the vehicle. Each time a frame of command is sent through the LF hardware module in the receiver A, each tire pressure sensor determines its own response timing according to its own position in the vehicle, and performs an orderly response. For example, the sensor in left front tire is B1, the sensor in right front tire is B2, the sensor in right rear tire is B3, and the sensor in left rear tire is B4. The receiver A may directly accurately determine which sensor data is received according to a time sequence of receiving the response, and the respective tire pressure sensors do not have a stacking phenomenon, which greatly improves the stability.

In the current field of unmanned aerial vehicles, most of them are one-to-one video display, or data is transmitted to a server, and then the data is forwarded to each terminal through the server to realize one-to-many data transmission, which is high in efficiency and cost. In a specific application scenario, an unmanned aerial vehicle A periodically sends a frame of connection broadcast, and performs a timing negotiation through responses of terminals B1, B2 and B3 to obtain timings allocated to the terminals B1, B2 and B3 by the unmanned aerial vehicle A. When the unmanned aerial vehicle A starts video shooting, real-time videos are sent to the terminals B1, B2 and B3 in the form of broadcasting, the terminals B1, B2 and B3 respond to the unmanned aerial vehicle according to the allocated timings, and the unmanned aerial vehicle A still periodically sends a frame of broadcast connection command, so as to still establish a communication connection with other terminals during the video transmission. When the connected terminal B2 has a broken link, the unmanned aerial vehicle A will reclaim the timing of the terminal B2, and this timing is allocated to other terminals, thereby improving the transmission efficiency of a video.

In a specific application scenario, the same function of multiple vehicles is subjected to fault diagnosis simultaneously by a diagnosis instrument A. By establishing a communication connection between the diagnosis instrument A and automobiles B1, B2, B3 and B4, timings allocated to the automobiles B1, B2, B3 and B4 are obtained by performing a timing negotiation between the diagnosis instrument A and the automobiles B1, B2, B3 and B4 through the communication connection. Upon completion of time allocation, the diagnosis instrument A sends instructions to the automobiles B1, B2, B3 and B4 by broadcasting, and respectively receives, according to the timings allocated to the automobiles B1, B2, B3 and B4, functional data responded by the corresponding automobiles B1, B2, B3 and B4 upon receiving of the instructions. After the automobiles B1, B2, B3 and B4 respond, the diagnosis instrument A analyzes the data of the respective automobiles respectively to obtain fault diagnosis reports of the respective automobiles. Since it is the fault diagnosis for the same function of the four vehicles B1, B2, B3 and B4 and the communication protocols of different vehicles are very similar, the fault diagnosis of a plurality of vehicles can be completed by sending one instruction through one diagnosis instrument. The fault diagnosis efficiency of the vehicle function is greatly improved.

The following is an embodiment about the apparatus of this application, which may be used for performing the embodiment about the above data transmission control method. Details not disclosed in the embodiment about the apparatus of this application should refer to the embodiment about the data transmission control method of this application.

Figure 8:
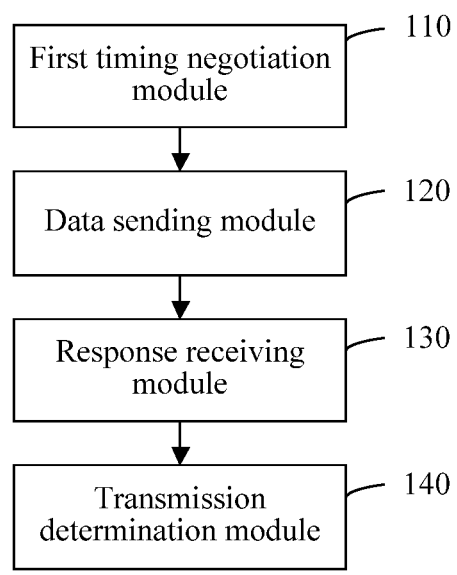
FIG. 8 is a block diagram of a data transmission control apparatus according to an exemplary embodiment.

FIG. 8 is a block diagram of a data transmission control apparatus according to an exemplary embodiment. The apparatus is applied to a master terminal for data transmission with slave terminals. The apparatus includes, but is not limited to, a first timing negotiation module 110, a data sending module 120, a response receiving module 130, and a transmission determination module 140.

The first timing negotiation module 110 is configured to perform a timing negotiation with the respective slave terminals to obtain timings allocated to the respective slave terminals.

The data sending module 120 is configured to send, upon completion of timing allocation, interactive data by means of broadcasting, the interactive data being sent to the slave terminals.

The response receiving module 130 is configured to receive responses of the respective slave terminals to the received interactive data according to the allocated corresponding timings.

The transmission determination module 140 is configured to acknowledge, using the received responses, completion of transmission of the interactive data to the slave terminals.

Details of the implementation process of the functions and effects of the respective modules in the above apparatus should refer to the implementation process of the corresponding steps in the above data transmission control method, and will not be described herein again.

Alternatively, the first timing negotiation module 110 is specifically configured to initiate a predetermined number of communication connection broadcasts, perform, for each communication connection broadcast, a timing negotiation with the slave terminal responding to the communication connection broadcast, and allocate the negotiated timing to the corresponding slave terminal.

Figure 9:
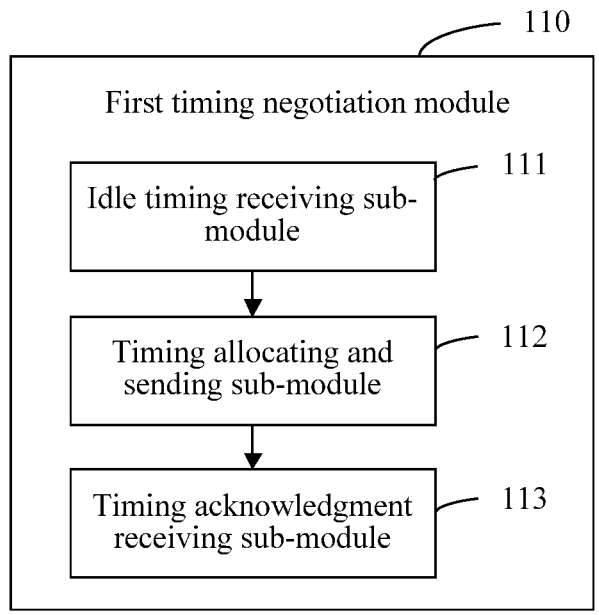
FIG. 9 is a block diagram of a first timing negotiation module shown by the corresponding embodiment of FIG. 8.

Alternatively, as shown in FIG. 9, the first timing negotiation module 110 includes, but is not limited to, an idle timing receiving sub-module 111, a timing allocating and sending sub-module 112 and a timing acknowledgment receiving sub-module 113.

The idle timing receiving sub-module 111 is configured to receive, upon initiation of each communication connection broadcast, an idle timing of the slave terminal responding to the communication connection broadcast.

The timing allocating and sending sub-module 112 is configured to allocate timings for the slave terminals according to the idle timing, and send the allocated timings to the slave terminals, different slave terminals corresponding to different timings.

The timing acknowledgment receiving sub-module 113 is configured to receive acknowledgment messages of the slave terminals for the respective allocated timings.

Figure 10:
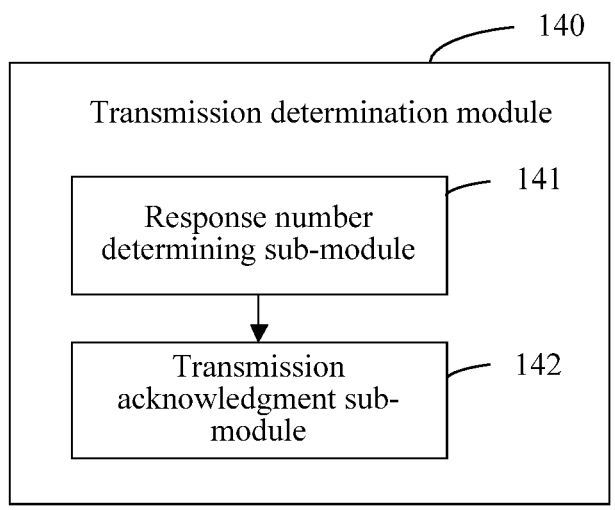
FIG. 10 is a block diagram of a transmission determination module shown by the corresponding embodiment of FIG. 8.

Alternatively, as shown in FIG. 10, the transmission determination module 140 includes, but is not limited to, a response number determining sub-module 141 and a transmission acknowledgment sub-module 142.

The response number determining sub-module 141 is configured to determine whether the number of the received responses is equal to the number of the slave terminals.

The transmission acknowledgment sub-module 142 is configured to acknowledge, when the response number determining sub-module 141 determines that the number of the received responses is equal to the number of the slave terminals, completion of transmission of the interactive data to the slave terminals.

Figure 11:
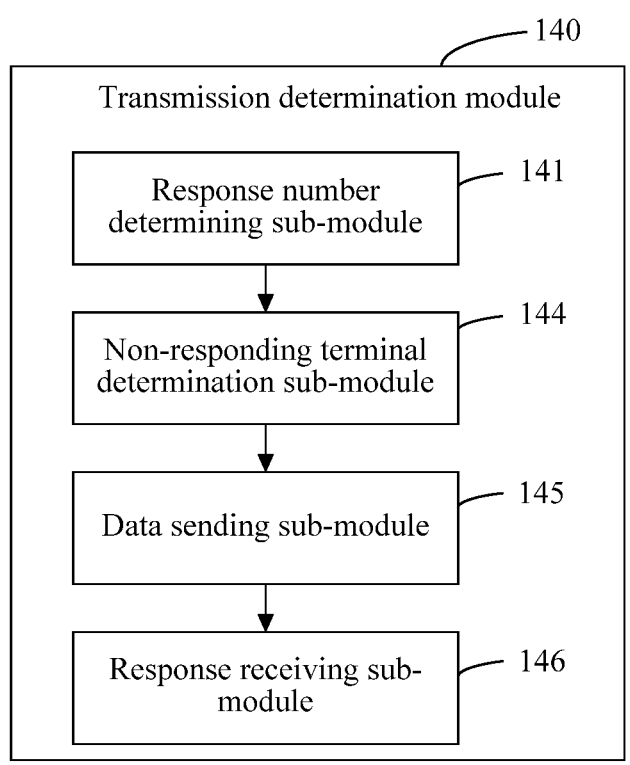
FIG. 11 is a block diagram of a transmission determination module shown by the corresponding embodiment of FIG. 8.

Alternatively, as shown in FIG. 11, the transmission determination module 140 may further include: a non-responding terminal determination sub-module 144, a data sending sub-module 145 and a response receiving sub-module 146.

The non-responding terminal determination sub-module 144 is configured to determine, when the response number determining sub-module 141 determines that the number of the received responses is not equal to the number of the slave terminals, non-responding terminals from the slave terminals according to terminal identifiers in the responses.

The data transmission sub-module 145 is configured to transmit the interactive data to the non-responding terminals.

The response receiving sub-module 146 is configured to receive responses of the non-responding terminals to the interactive data, and acknowledge completion of transmission of the interactive data.

Figure 12:
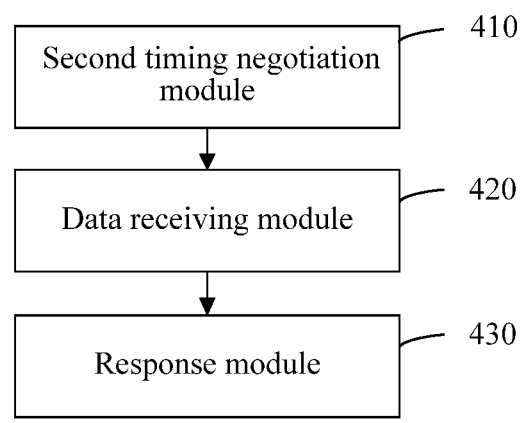
FIG. 12 is a block diagram of a data transmission control apparatus according to an exemplary embodiment.

FIG. 12 is a block diagram of a data transmission control apparatus according to an exemplary embodiment. The apparatus is applied to a slave terminal for data transmission with a master terminal. The master terminal is allowed for data transmission with at least two slave terminals. The apparatus includes, but is not limited to, a second timing negotiation module 410, a data receiving module 420 and a response module 430.

The second timing negotiation module 410 is configured to acquire timings obtained by a timing negotiation with the master terminal and allocated to the slave terminals.

The data receiving module 420 is configured to receive, upon obtaining of the timings, interactive data sent by the master terminal by means of broadcasting.

The response module 430 is configured to respond to the interactive data according to the allocated timings.

Figure 13:
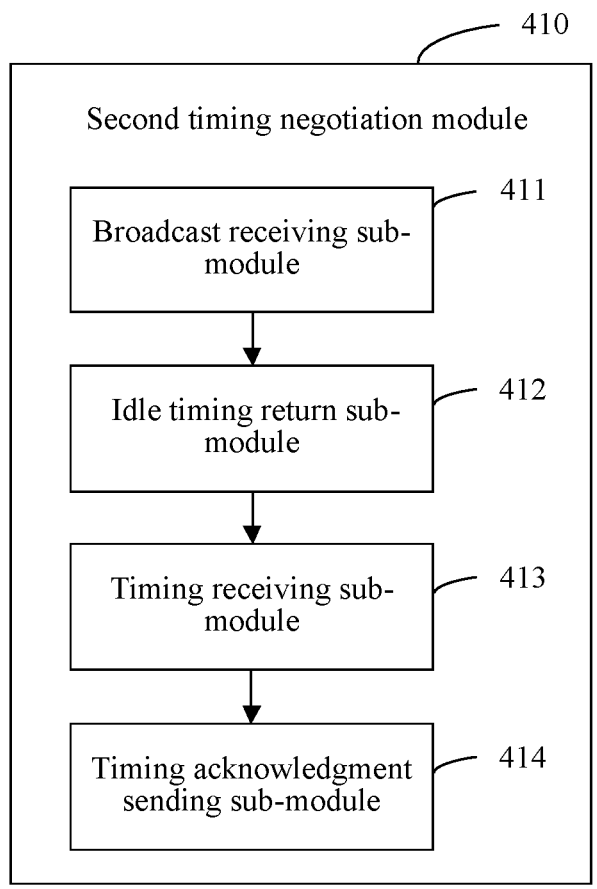
FIG. 13 is a block diagram of a second timing negotiation module shown by the corresponding embodiment of FIG. 12.

Alternatively, as shown in FIG. 13, the second timing negotiation module 410 includes, but is not limited to, a broadcast receiving sub-module 411, an idle timing return sub-module 412, a timing receiving sub-module 413, and a timing acknowledgment sending sub-module 414.

The broadcast receiving sub-module 411 is configured to receive a communication connection broadcast sent by the master terminal.

The idle timing return sub-module 412 is configured to return, for the communication connection broadcast, at least one idle timing to the master terminal.

The timing receiving sub-module 413 is configured to receive timings allocated, by the master terminal, to the slave terminals according to the at least one idle timing.

The timing acknowledgment sending sub-module 414 is configured to send an acknowledgment message to the master terminal according to the allocated timings.

Figure 14:
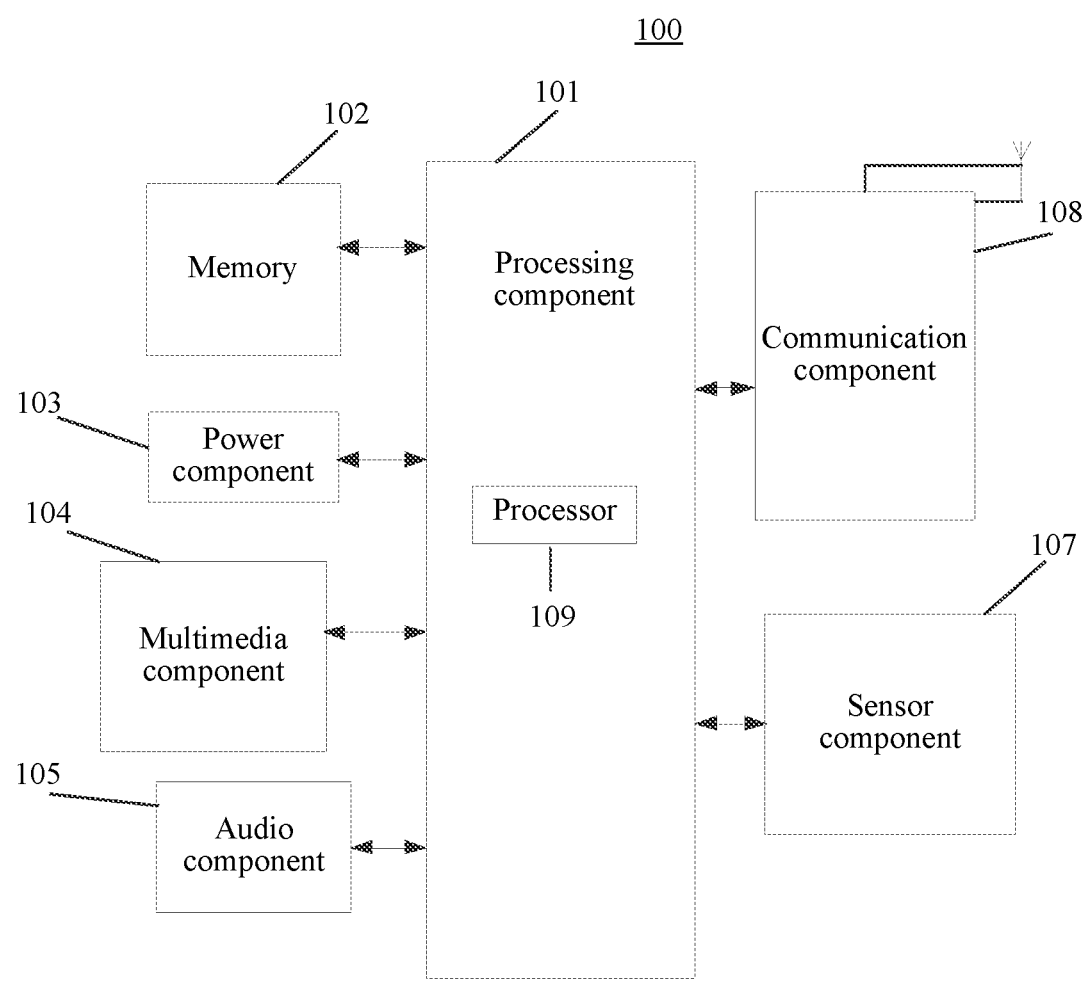
FIG. 14 is a structure block diagram of a terminal according to an exemplary embodiment.

FIG. 14 is a block diagram of a terminal 100 according to an exemplary embodiment. The terminal 100 may be the master terminal described in the above embodiments, or may be the slave terminal described in the above embodiments. When the terminal 100 is the master terminal, all or part of the steps in the method shown in any of FIG. 2, FIG. 3 and FIG. 4 are performed. When the terminal 100 is the slave terminal, all or part of the steps in the method shown in any of FIG. 5 and FIG. 6 are performed.

Referring to FIG. 14, the terminal 100 may include one or more of the following components: a processing component 101, a memory 102, a power component 103, a multimedia component 104, an audio component 105, a sensor component 107, and a communication component 108. The above components are not all necessary, and for the terminal 100, other components may be added or some components may be removed according to own functional requirements, which is not limited in the present embodiment.

The processing component 101 typically controls the overall operation of the terminal 100, such as operations associated with display, telephone calls, data communications, camera operations, and recording operations. The processing component 101 may include one or more processors 109 to execute instructions to complete all or part of the steps of the above operations. Moreover, the processing component 101 may include one or more modules to facilitate interaction between the processing component 101 and other components. For example, the processing component 101 may include a multimedia module to facilitate interaction between the multimedia component 104 and the processing component 101.

The memory 102 is configured to store various types of data to support operations at the terminal 100. Examples of such data include instructions for any application or method operating on the terminal 100. The memory 102 may be implemented by any type of volatile or non-volatile storage device or a combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disc. Also stored in the memory 102 is one or more modules, configured to be executed by the one or more processors 109 to complete all or part of the steps in the method shown in any of FIG. 2, FIG. 3, FIG. 4, FIG. 5 and FIG. 6.

The power component 103 provides power to various components of the terminal 100. The power component 103 may include a power management system, one or more power supplies, and other components associated with generating, managing, and distributing power for the terminal 100.

The multimedia component 104 includes a screen that provides an output interface between the terminal 100 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, slides and gestures on the touch panel. The touch sensor may not only sense the boundary of a touch or slide operation, but also detect the duration and pressure associated with the touch or slide operation.

The audio component 105 is configured to output and/or input an audio signal. For example, the audio component 105 includes a microphone that is configured to receive an external audio signal when the terminal 100 is in an operational mode, such as a call mode, a recording mode and a voice recognition mode. The received audio signal may be further stored in the memory 102 or transmitted via the communication component 108. In some embodiments, the audio component 105 further includes a loudspeaker for outputting an audio signal.

The sensor assembly 107 includes one or more sensors for providing the terminal 100 with various aspects of state assessment. For example, the sensor assembly 107 may detect an open/closed state of the terminal 100 and the relative positioning of the components, and the sensor assembly 107 may further detect a position change of the terminal 100 or one component of the terminal 100 and a temperature change of the terminal 100. In some embodiments, the sensor assembly 107 may further include a magnetic sensor, a pressure sensor, or a temperature sensor.

The communication component 108 is configured to facilitate wired or wireless communication between the terminal 100 and other devices. The terminal 100 may access a wireless network based on a communication standard, such as wireless-fidelity (WiFi), 2G or 3G, or a combination thereof. In an exemplary embodiment, the communication component 108 receives a broadcast signal or broadcast associated information from an external broadcast management system via a broadcast channel. In an exemplary embodiment, the communication component 108 further includes a near field communication (NFC) module to facilitate short range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the terminal 100 may be implemented by one or more application specific integrated circuits (ASIC), digital signal processors (DSP), programmable logic devices (PLD), field-programmable gate arrays (FPGA), controllers, micro-controllers, micro-processors or other electronic elements, for performing the above method.

The specific manner in which the processor of the terminal in the present embodiment performs the operation has been described in detail in the embodiment about the data transmission control method, and will not be explained in detail herein.

It will be appreciated that this application is not limited to the precise structures described above and shown in the drawings, and various modifications and changes can be made by those skilled in the art without departing from the scope thereof. The scope of this application is limited only by the appended claims.

What is claimed is:

1. A data transmission control method, applied to a master terminal allowed for data transmission with at least two slave terminals, the method comprising:
   performing, by the master terminal, a timing negotiation with the at least two slave terminals to determine timings allocated for the each of the at least two slave terminals;
   sending, by the master terminal, interactive data by means of a broadcast frame to the at least two slave terminals after completion of timing negotiation;
   receiving, by the master terminal, responses to the interactive data from each of the at least two slave terminals according to the allocated corresponding timings; and
   acknowledging, by the master terminal, completion of transmission of the interactive data to the slave terminals based on the received responses;
   wherein the master terminal is a programming tool, the slave terminals are tire pressure sensors;
   wherein the broadcast frame carries a special slave identification code, the special slave identification code comprises all ones or all zeros.

2. The method according to claim 1, wherein the step of performing a timing negotiation with the at least two slave terminals to determine timings allocated for the each of the at least two slave terminals comprises:
   initiating, by the master terminal, a predetermined number of communication connection broadcasts, performing, by the master terminal, for each communication connection broadcast, a timing negotiation with the slave terminal responding to the communication connection broadcast, and allocating, by the master terminal, the negotiated timing for the corresponding slave terminal.

3. The method according to claim 2, wherein the step of initiating a predetermined number of communication connection broadcasts, performing, for each communication connection broadcast, a timing negotiation with the slave terminal responding to the communication connection broadcast and allocating the negotiated timing for the corresponding slave terminal comprises:

receiving, by the master terminal, upon initiation of each communication connection broadcast, an idle timing of each slave terminal responding to the communication connection broadcast;

allocating, by the master terminal, timings for the slave terminals according to the idle timing, and sending, by the master terminal, the allocated timings to the slave terminals, different slave terminals corresponding to different timings; and receiving, by the master terminal, acknowledgment messages of the slave terminals for the respective allocated timings.

4. The method according to claim 1, wherein the step of acknowledging completion of transmission of the interactive data to the slave terminals based on the received responses comprises:

determining, by the master terminal, whether a number of the received responses is equal to a number of the slave terminals; and if yes, acknowledging, by the master terminal, completion of transmission of the interactive data to the slave terminals.

5. The method according to claim 4, further comprising:

if the number of the received responses is not equal to the number of the slave terminals, determining, by the master terminal, non-responding terminals from the slave terminals according to terminal identifiers in the responses;

sending, by the master terminal, the interactive data to the non-responding terminals; and receiving, by the master terminal, responses of the non-responding terminals to the interactive data, and acknowledging completion of transmission of the interactive data.

6. A data transmission control method, applied to slave terminals for data transmission with a master terminal, the master terminal being allowed for data transmission with at least two of the slave terminals, the method comprising:

acquiring, by at least two of the slave terminals, timings by performing a timing negotiation with the master terminal and allocated for the slave terminals;

receiving, by the at least two of the slave terminals, upon obtaining of the timings, interactive data sent by the master terminal by means of broadcasting; and responding, by the at least two of the slave terminals, to the interactive data according to the allocated timings;

wherein the master terminal is a programming tool, the slave terminals are tire pressure sensors;

wherein the broadcast frame carries a special slave identification code, the special slave identification code comprises all ones or all zeros.

7. The method according to claim 6, wherein the step of acquiring timings obtained by performing a timing negotiation with the master terminal and allocated for the slave terminals comprises:

receiving, by the at least two of the slave terminals, a communication connection broadcast sent by the master terminal;

returning, by the at least two of the slave terminals, for the communication connection broadcast, at least one idle timing to the master terminal;

receiving, by the at least two of the slave terminals, timings allocated, by the master terminal, for the slave terminals according to the at least one idle timing; and sending, by the at least two of the slave terminals, an acknowledgment message to the master terminal according to the allocated timings.

8. A tire pressure sensor programming method, comprising:

performing, by a programming tool, a timing negotiation with at least two tire pressure sensors to obtain timings allocated for the respective tire pressure sensors;

sending, by the programming tool, programming data to the respective tire pressure sensors in a broadcasting frame, wherein the broadcast frame carries a special slave identification code, the special slave identification code comprises all ones or all zeros;

receiving, by the programming tool, responses of the respective tire pressure sensors to the received programming data according to the allocated timings; and acknowledging, by the programming tool, using the received responses, completion of transmission of the programming data to the respective tire pressure sensors.

9. The method according to claim 8, wherein the step of performing a timing negotiation with at least two tire pressure sensors to obtain timings allocated for the respective tire pressure sensors comprises:

initiating, by the programming tool, a predetermined number of communication connection broadcasts, performing, by the programming tool, for each communication connection broadcast, a timing negotiation with the tire pressure sensor responding to the communication connection broadcast, and allocating, by the programming tool, the negotiated timing to the corresponding tire pressure sensor.

10. The method according to claim 9, wherein the step of initiating a predetermined number of communication connection broadcasts, performing, for each communication connection broadcast, a timing negotiation with the tire pressure sensor responding to the communication connection broadcast and allocating the negotiated timing to the corresponding tire pressure sensor comprises:

receiving, by the programming tool, upon initiation of each communication connection broadcast, an idle timing of each tire pressure sensor responding to the communication connection broadcast;

allocating, by the programming tool, timings for the tire pressure sensors according to the idle timing, and sending the allocated timings to the tire pressure sensors, different tire pressure sensors corresponding to different timings; and receiving, by the programming tool, acknowledgment messages of the tire pressure sensors for the respective allocated timings.

11. The method according to claim 10, wherein the step of acknowledging, using the received responses, completion of transmission of the programming data to the respective tire pressure sensors comprises:
   determining, by the programming tool, whether the number of the received responses is equal to a number of the tire pressure sensors; and
   if yes, acknowledging, by the programming tool, completion of transmission of the programming data to the respective tire pressure sensors.

12. The method according to claim 9, wherein the step of acknowledging, using the received responses, completion of transmission of the programming data to the respective tire pressure sensors comprises:
   determining, by the programming tool, whether the number of the received responses is equal to a number of the tire pressure sensors; and
   if yes, acknowledging, by the programming tool, completion of transmission of the programming data to the respective tire pressure sensors.

13. The method according to claim 8, wherein the step of acknowledging, using the received responses, completion of transmission of the programming data to the respective tire pressure sensors comprises:
   determining, by the programming tool, whether the number of the received responses is equal to a number of the tire pressure sensors; and
   if yes, acknowledging, by the programming tool, completion of transmission of the programming data to the respective tire pressure sensors.

14. The method according to claim 13, further comprising:
   if the number of the received responses is not equal to a number of the tire pressure sensors, determining, by the programming tool, non-responding tire pressure sensors according to tire pressure sensor identifiers in the responses;
   sending, by the programming tool, the programming data to the non-responding tire pressure sensors; and
   receiving, by the programming tool, responses of the non-responding tire pressure sensors to the programming data, and acknowledging completion of transmission of the programming data.

15. The method according to claim 8, further comprising:
   displaying, by the programming tool, a result of programming the at least two tire pressure sensors.

* * * * *